(12) United States Patent
Hanna et al.

(10) Patent No.: US 6,671,835 B1
(45) Date of Patent: Dec. 30, 2003

(54) ERROR DETECTION IN DIGITAL SCANNING DEVICE HAVING PARALLEL DATA STREAMS

(75) Inventors: Stephen Dale Hanna, Boulder, CO (US); Phillip Keith Hoskins, Larimer, CO (US); Steven G. Ludwig, Boulder, CO (US); Charles Harwood Morris, III, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,086

(22) Filed: May 15, 2000

(51) Int. Cl.[7] .............................. G01R 31/28; G06F 7/02
(52) U.S. Cl. ........................................ 714/712; 714/820
(58) Field of Search .............................. 714/712, 719, 714/820, 724, 57, 48, 43, 24; 358/504, 406

(56) References Cited

U.S. PATENT DOCUMENTS

| | | | | |
|---|---|---|---|---|
| 4,342,096 A | * | 7/1982 | McDevitt | 358/1.11 |
| 5,032,904 A | | 7/1991 | Murai et al. | 358/75 |
| 5,077,656 A | * | 12/1991 | Waldron et al. | 710/305 |
| 5,130,823 A | | 7/1992 | Bowers | 358/465 |
| 5,345,419 A | | 9/1994 | Fenstermaker et al. | 365/189.04 |
| 5,426,756 A | | 6/1995 | Shyi et al. | 395/425 |
| 5,469,276 A | | 11/1995 | Shu | 358/534 |
| 5,469,449 A | | 11/1995 | Park | 371/40.1 |
| 5,471,313 A | | 11/1995 | Thieret et al. | 358/296 |
| 5,532,839 A | * | 7/1996 | Beikirch et al. | 358/401 |
| 5,594,743 A | | 1/1997 | Park | 371/40.1 |
| 5,642,204 A | | 6/1997 | Wang | 358/455 |
| 5,675,716 A | | 10/1997 | Shu | 395/109 |
| 5,757,976 A | | 5/1998 | Shu | 382/252 |
| 5,784,390 A | | 7/1998 | Masiewicz et al. | 371/40.11 |
| 5,818,032 A | | 10/1998 | Sun et al. | 235/494 |
| 5,892,979 A | | 4/1999 | Shiraki et al. | 395/872 |
| 5,956,420 A | | 9/1999 | Ikenoue | 382/164 |
| 5,991,304 A | | 11/1999 | Abramson | 370/413 |

OTHER PUBLICATIONS

Improved First–In First–Out, IBM Technical Disclosure Bulletin, vol. 39 No. 04 Apr. 1996, pp. 45–46.

* cited by examiner

*Primary Examiner*—Christine T Tu
(74) *Attorney, Agent, or Firm*—Kunzler & Associates

(57) ABSTRACT

A method and apparatus for error checking in a digital scanning device. An error detection pattern is written into each of a plurality of parallel data streams. Each of the data streams is then transmitted through a separate parallel data channel. The error detection patterns in the data streams are then concurrently compared to one another to check for an error condition of the data stream. If the error detection patterns are not received substantially concurrently, an error condition is considered to have occurred. The error detection pattern may comprise end of scan, end of sheet or First-In First-Out (FIFO) buffer data. While all error conditions are false, printing and data transmission continue. Printing and data transmission are terminated if any error condition is true, and an error notification message is generated.

26 Claims, 7 Drawing Sheets

ERROR DETECTION IN DIGITAL SCANNING DEVICE HAVING PARALLEL DATA STREAMS

BACKGROUND OF THE INVENTION

1. The Field of the Invention

The present invention relates to the field of digital scanning devices such as printers. More specifically, the present invention relates to error checking in digital scanning devices.

2. The Relevant Art

In digital scanning devices such as printers, a host computer is often configured to send control data to command various operations of the printer. One type of control data relates to the positioning of page data to be generated by the printer on a print surface.

Typically, in such systems, a printed image is formed using digital data that resides in the page memory of a processor. In one type of printer system, the image from the page memory is formed on a print surface using a scanning laser beam. An area of the print surface on which the image is formed is referred to as a picture element (PEL). One scan of the laser beam across the print surface forms a row of PELs, referred to as a scan row. The image from the page memory is formed with multiple scan rows. Each scan row contains an end of row marker that notifies the print engine that it has reached the end of a row and needs to begin a new row.

Furthermore, when the data is transmitted to the print engine from the host computer, it is broken up into sheets. A sheet is a boundary of the image being transmitted and may contain several pages. It is critical that each sheet begins and ends properly so that elements within the sheet are aligned as intended. To ensure that each sheet is properly positioned, the host computer includes an end of sheet marker in the print data sent to the print engine. Alternatively, a data stream decompressor may mark the last word of a scan or sheet, separately from the print data.

In some printers, a system is used to transmit the data from the host computer to the print engine that employs a set of First-In First-Out (FIFO) buffers to help reduce fluctuations in the flow of the data to the print engine. It is possible to have errors introduced into the data stream within the FIFOs. Should these errors be introduced into a data stream while it is being passed through the FIFO buffers, the printer would print an incorrect image.

The first PEL must be properly positioned in order for the scan rows to be horizontally and vertically aligned on the print surface. Also, the correct end of sheet markers must be received and there must be no errors introduced into the data stream through the use of the FIFO buffers. Should any of the above-mentioned errors occur, the scan rows of the data might "walk," that is, be misaligned. This misalignment may go undetected if the user of the printer system does not inspect each printed page.

The speed with which printed materials can be generated is of great importance to the performance and appeal of a printing system. In current print systems, scan rows are processed one at a time. While this configuration accomplishes the task of printing materials, it takes a significant amount of time. The speed of the printing process could be significantly increased if a plurality of scan rows were processed simultaneously. Nevertheless, so doing drastically complicates printer control and provides greater capacity for errors such as those described above.

From the above discussion, it can be seen that it would be beneficial to improve the performance of print head controllers by providing a method of error checking and print processing that can reliably detect the conditions discussed above, and especially in printers and other digital scanning devices configured to receive parallel streams of print data.

OBJECTS AND BRIEF SUMMARY OF THE INVENTION

The method of the present invention has been developed in response to the present state of the art, and in particular, in response to the problems and needs in the art that have not yet been fully solved by currently available error detection methods in digital data reproduction. Accordingly, it is an overall object of the present invention to provide a method that overcomes many or all of the above-discussed shortcomings in the art.

To achieve the foregoing object, and in accordance with the invention as embodied and broadly described herein in the preferred embodiment, an improved method is provided.

The present invention provides a method and apparatus for error checking in a printer system employing a plurality of data streams. The method in one embodiment comprises generating an error detection pattern in a predetermined segment in each of a plurality of data streams. Each of the data streams is then transmitted through a separate data channel to a termination point. When the data streams reach the termination point of their respective data channels, the error detection patterns are concurrently compared to determine if an error has occurred. An exclusive OR circuit may be used for the comparison operations.

If the error detection patterns occur substantially simultaneously in each of the data streams, the monitored errors are not present. The data is merged and transmitted to a print engine for printing. If, however, the error detection patterns indicate that an error is present, transmission of the data is terminated and a notification message is sent to the host computer.

Additional features and advantages of the present invention will be apparent from the accompanying drawings and from the detailed description that follows.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
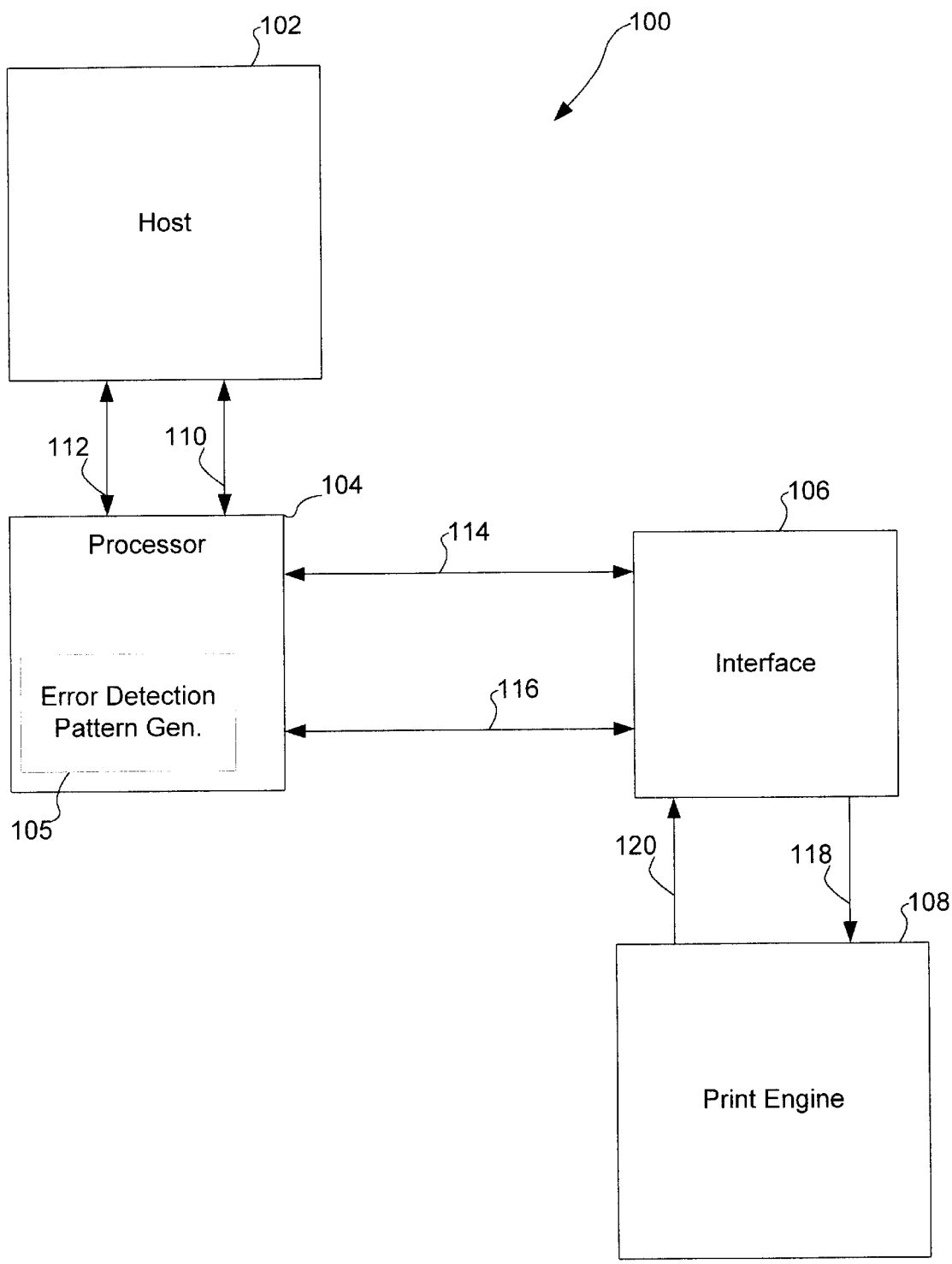
FIG. 1 is a schematic block diagram illustrating one embodiment of a data printing system of the present invention.

FIG. 1 illustrates one embodiment of a data printing system of the present invention. The data printing system 100 as shown includes a host 102, a processor 104, an interface 106, and a print engine 108. The data printing system 100 is configured to transmit data from the host 102 to be printed by the print engine 108. The host 102 may be any type of computer system, suitable examples of which include a laptop computer, a desktop computer, a workstation, a server, and a mainframe. The data and control signals transmitted by the host 102 are coupled to the processor 104 on the signal lines 112 and 110, respectively.

The processor 104 preferably contains microcode configured to construct an image to be printed by the print engine 108. The print image is digitally formed in a page memory of the processor 104 in a format required by the print engine 108 to generate an image. In one embodiment, the processor 104 is a reduced instruction set (RISC) microprocessor. In further embodiments, the processor 104 may have other types of architectures, for example, a complex instruction set (CISC) architecture. It should be noted that microprocessors are well known in the art; accordingly, a detailed description of the internal components and operation of the processor 104 is not provided herein.

The interface 106 couples data and control signals from the processor 104 on the lines 114 and 116, respectively, and passes data and control signals to the print engine 108 on lines 118 and 120, respectively. In one embodiment, the print engine 108 is an digital scanning device that functions to generate a visible image from digital data residing in the page memory of the processor 104. In another embodiment, the print engine 108 is a color laser printer. The laser beams are scanned across a photoconductor creating picture element (PEL) rows to form a visible image on a print surface. In another embodiment, the print engine 108 is provided with eight beams, but of course may have more or less than eight beams. Additionally, multiple print beams may be present, and there may be a plurality of print beams per color per side, as well as multiple print heads per side. For instance, in one embodiment, there may be four print heads on two sides, each print head having multiple beams.

Figure 2:
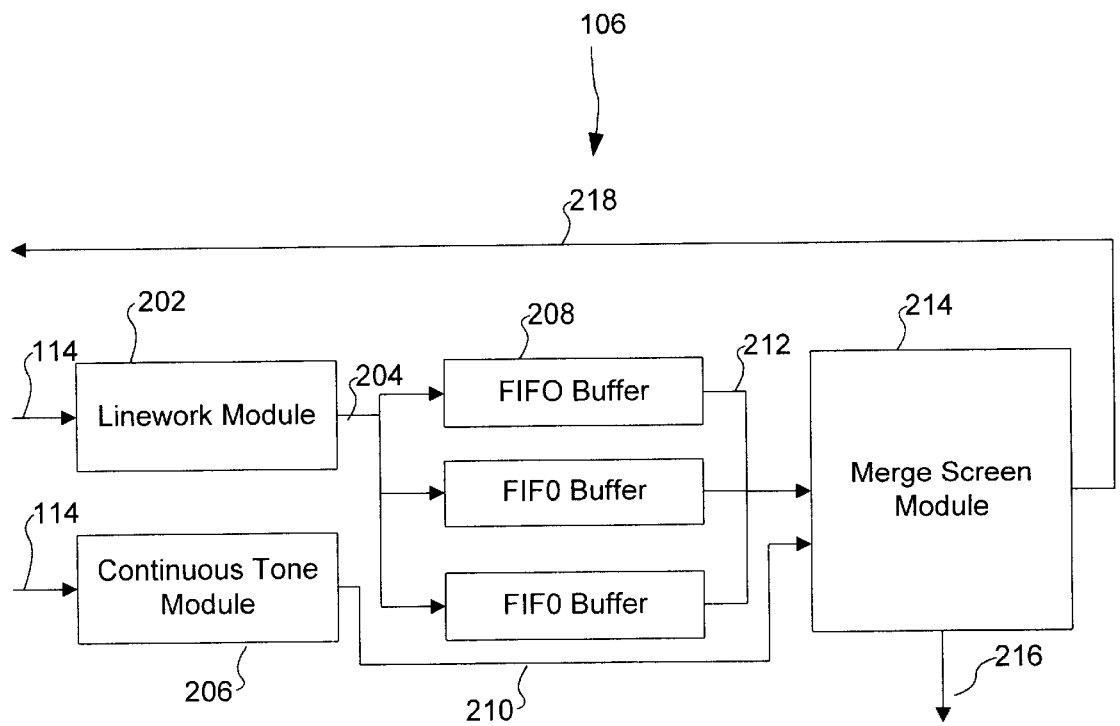
FIG. 2 is a schematic block diagram illustrating one embodiment of a portion of an interface module of FIG. 1.

FIG. 2 illustrates one embodiment of an interface 106 between the processor 104 and the print engine 108 of FIG. 1. The interface 106 receives image data from the processor 104 in various compressed formats. One format comprises JPEG image data and is processed by the Continuous Tone (CT) module 206. Other types of formats are processed by the Linework (LW) module 202. These formats may include an encoding scheme such as run length encoding (RLE), one example of which is the proprietary IBM LineWork Compression Algorithm.

The CT module 206 receives data from the processor 104 of FIG. 1 through the data line 114 as shown. The JPEG data is then decompressed and sent to the Merge Screen (MS) module 214 via a data line 210. The data stream received from the CT module 206 is then compared with the data received from the LW module 202 to check for error conditions.

The LW module 202 receives data from the processor 104 of FIG. 1 via the data line 114. The image data sent to the LW module 202 may consist of additional image data or text data. The image data is first compressed using the Linework compression algorithm in the processor 104. The LW module 202 serves to decompress the data. When the data has been decompressed, it is transmitted via data line 204 to a set of FIFO buffers 208. The FIFO buffers 208 then transmit the data to the MS module 214 via data line 212.

The data from the Linework (LW) module 202 and the Continuous Tone (CT) module 206 each contain information for the same print area on the print surface. The Merge Screen (MS) module 214 selects which data stream, either the stream from the LW module 202 or the CT module 206, is sent to the print engine 108 of FIG. 1 to be applied to the print surface. Data is screened and then transmitted from the MS module to the print engine 108 of FIG. 1 via the data line 216 as shown.

Figure 2A:
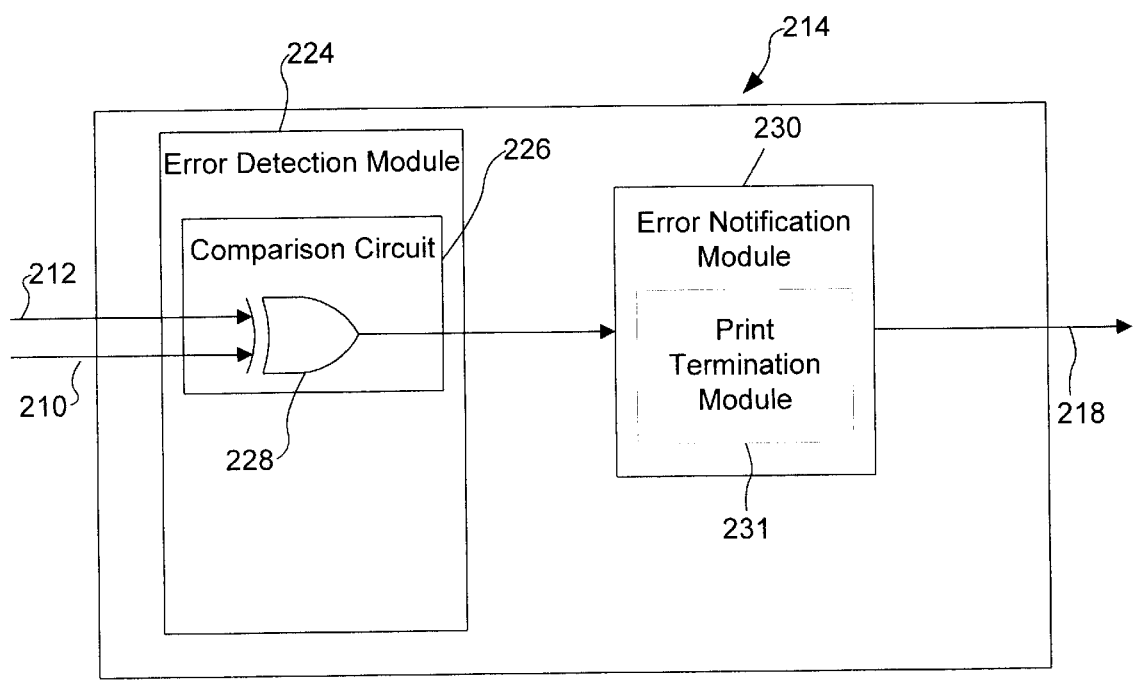
FIG. 2a is a schematic block diagram illustrating one embodiment of error detection logic of a Merge Screen module of FIG. 2.

The MS module 214 additionally performs error checking on the data received from the LW module 202 and the CT module 206. One manner of implementing the error checking is shown in the error detection module 224 of FIG. 2a. The error detection module 224, as depicted, comprises a comparison circuit 226. In one embodiment, given by way of example, the comparison circuit utilizes an exclusive OR logic chip 228. The exclusive OR logic chip 228 compares the data received from the LW module 202 and CT module 206 to determine whether the error detection pattern from each stream of data arrived substantially simultaneously. If so, the two (or more) data streams are properly synchronized. If, however, the error detection patterns of each data stream are not received substantially at the same time, an error condition is considered to have occurred.

When an error is detected in this or other manners, an error notification module 230 is notified and in response generates an error notification message. The error notification message is preferably transmitted to the processor 104 of FIG. 1 via the data line 218 as shown. Additionally, a print termination module 231 may be provided and preferably functions to notify the processor 104 to terminate the print job.

Figure 3:
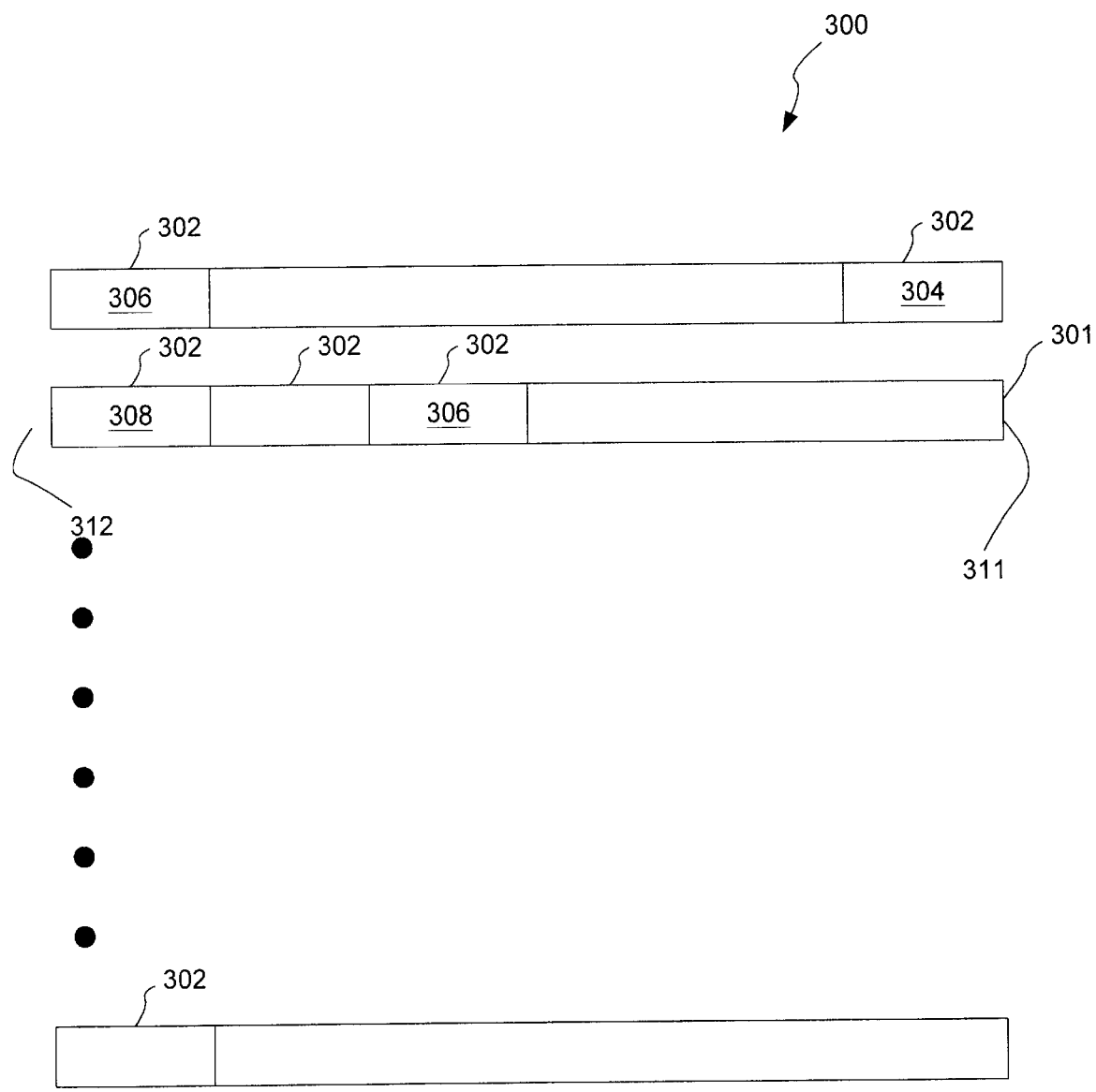
FIG. 3 illustrates one embodiment of a set of scan rows patterns of the present invention.

FIG. 3 illustrates one embodiment of scan line patterns. The page data generated in the processor 104 of FIG. 1 is configured into multiple scan lines 300. Each scan line 300 is made up of multiple bytes 302 containing the page data to be printed. In a color printing system, for example, each of the bytes 302 of a scan line contain color information that the print engine 108 uses to generate a color shade to be printed at a particular bit location on the print surface.

Under the present invention, an error detection pattern is written into a predetermined test byte from among the multiple bytes 302 of a scan line. The error detection pattern may also be attached as an extra status line between the LW module 202 and the merge screen module 214 and/or between the CT module 206 and the merge screen module 214. When so employed, a bit is preferably turned on to indicate the end of scan or end of sheet.

In one embodiment, the error detection pattern consists of the end of scan marker and resides in the last byte 304 of the scan line 300. In another embodiment, the error detection pattern comprises the end of sheet marker and resides in the last byte 304 of the scan line 300. In yet another embodiment, two types of error detection patterns are used, both the end of scan marker and an end of sheet marker. The error detection pattern, in a further embodiment may contain information about the First-In First-Out (FIFO) buffers 208 shown as part of the interface 106 depicted in FIG. 2.

A byte 306 of scanned data is shown in its correct position in a scan line 300. If the page data walks, or becomes misaligned, the byte 306 of scanned data is shifted from its original position in the scan line to some other position in the scan line. In the scan line 301, for example, the byte 306 of scanned data is shifted from a position of the first byte to a position towards the middle of the scan line. The bytes shifted at the end 311 of the scan line 301 will be wrapped around to the beginning of the next scan line. As such, the first byte position 308 of the scan line 301 will contain incorrect page data information.

Figure 4:
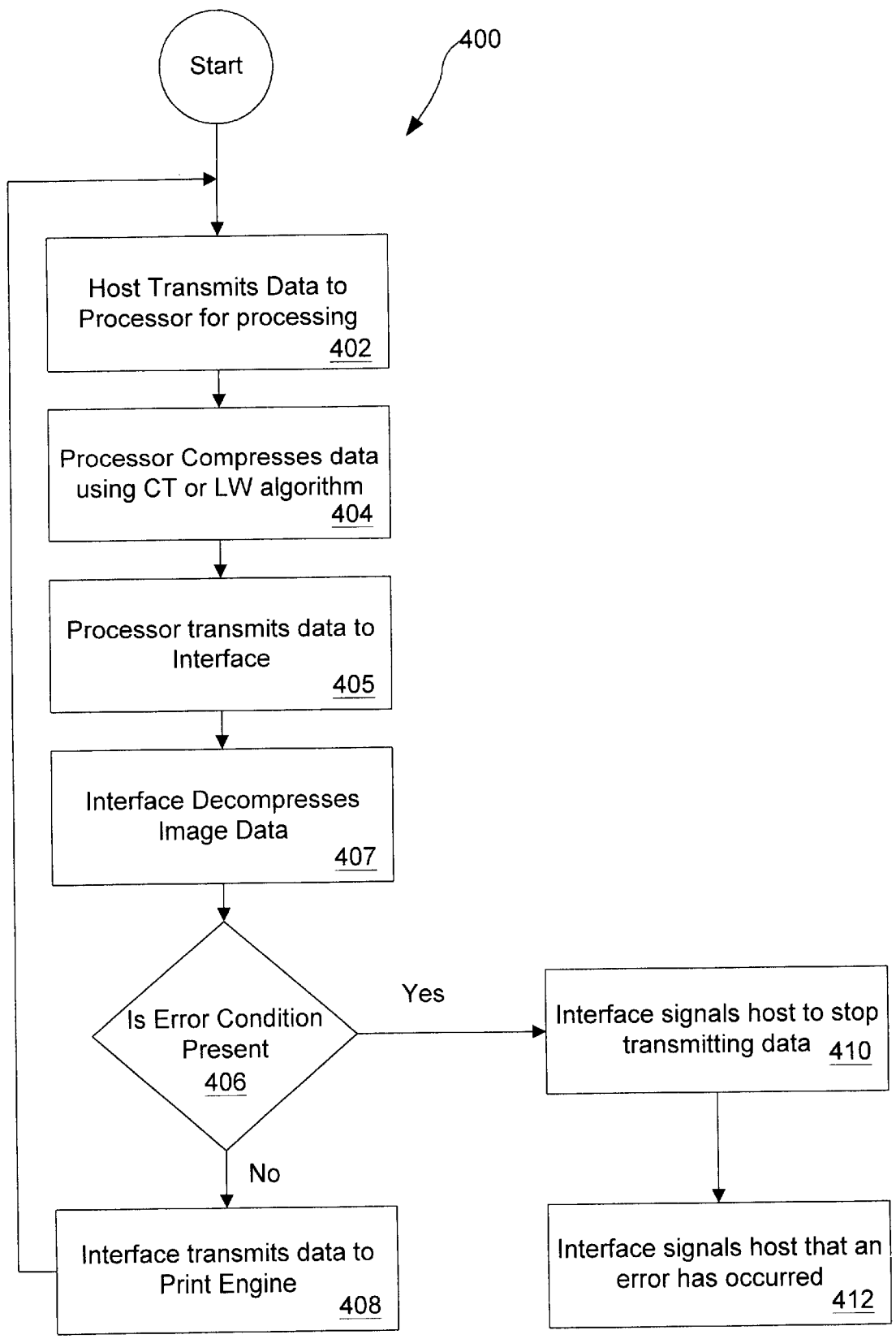
FIG. 4 is a flow diagram illustrating one embodiment of a printing process employing an error check of the present invention.

FIG. 4 is a schematic flow chart diagram illustrating one embodiment of a general error checking process 400 suitable for use with the system 100 of FIGS. 1 and 2. The host 102 of FIG. 1 transmits image data to the processor 104 of FIG. 1 in a step 402. The processor 104 of FIG. 1 compresses the image data using either a continuous tone or a Linework algorithm in a step 404. Once the data has been compressed, it is transmitted in a step 405 to the interface 106 of FIG. 1 which in one embodiment comprises a color interface card (CIC). The LW module 202 and the CT module 206 of FIG. 2 then decompress the data in step a 407, and the MS module 214 of FIG. 2 checks for any error conditions in the data in a step 406.

If the MS module 214 of FIG. 2 finds no error conditions present within the data streams, the data is transmitted to the print engine in step 408 and the process 400 continues as long as print data is transmitted. If, however, the MS module 214 of FIG. 2 finds that any of the data streams have errors present, a stop data signal is sent in a step 410 to the host 102 of FIG. 1. The interface 106 of FIG. 1 further notifies the host with an error message in a step 412. In one embodiment, the error notification module 230 of FIG. 2a handles the error message communications as discussed above.

Figure 5:
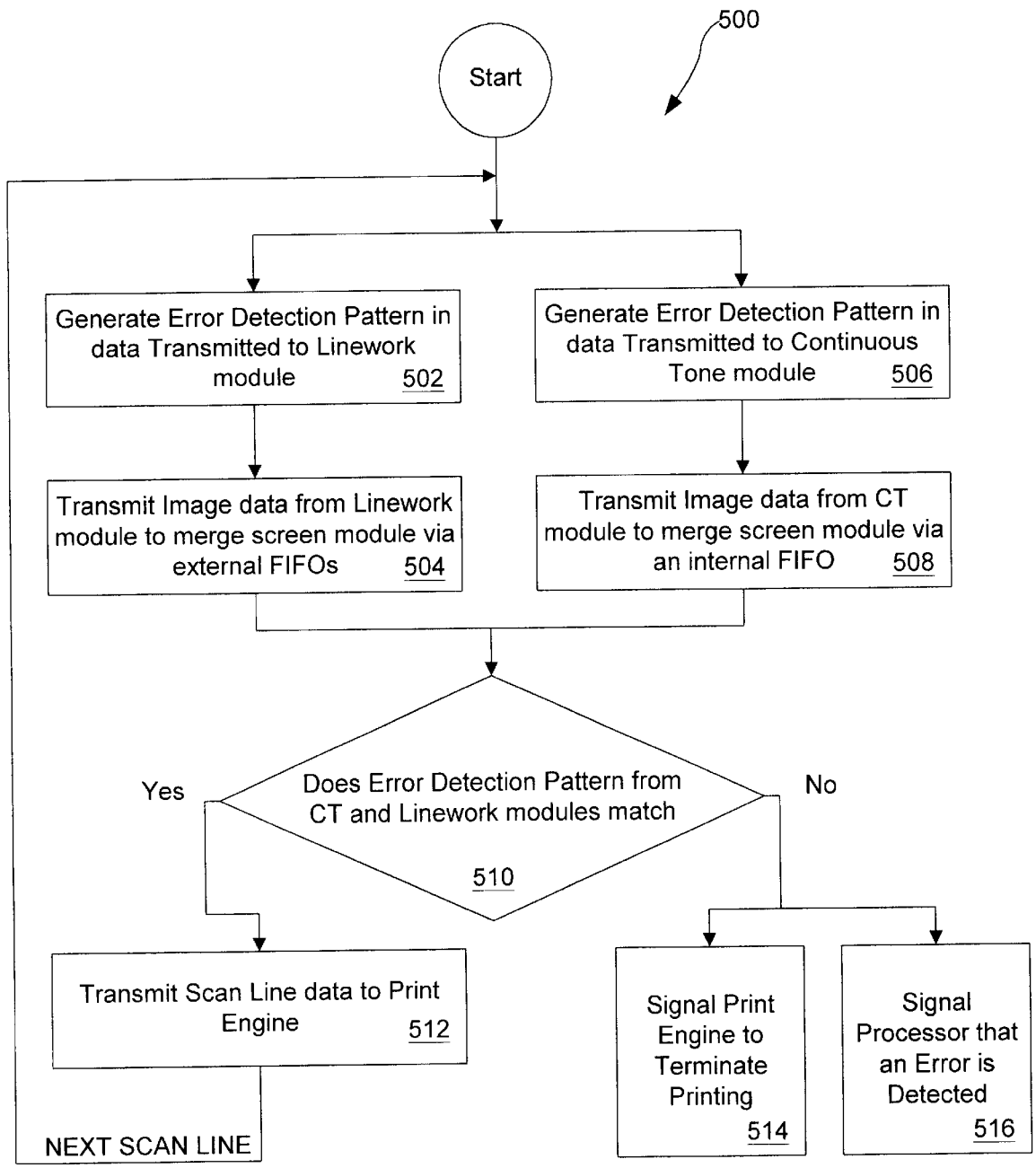
FIG. 5 is a flow diagram illustrating one embodiment of an error check process employing an error check of the present invention.

FIG. 5 is a schematic flow chart diagram illustrating one embodiment of a more specific error check process 500 for conducting the error checking of step 406 of FIG. 4. Initially in the process 500, the processor 104 of FIG. 1 generates error detection patterns. Preferably, a separate pattern is generated for each parallel data stream. For instance, in a step 502, the processor 104 generates an error detection pattern in the data stream that is transmitted to the Linework module 202 of FIG. 2. Similarly, in a step 506, the processor 104 generates and error detection pattern in the data stream that is transmitted to the Continuous Tone (CT) module 206 of FIG. 1. Error patterns may similarly be generated in any other concurrently transmitted data streams.

The error detection patterns contain data that the print engine 108 of FIG. 1 uses to align each scan line correctly on the print surface. The pattern may be, in one embodiment, an end of scan marker that indicates the end of a scan line. In another embodiment, the pattern may be an end of sheet marker that indicates the end of a sheet of data. In a further embodiment, error detection patterns may be generated both for end of sheet markers and end of scan markers.

Once the print data has been transmitted to the Linework (LW) module 202 of FIG. 2, it is decompressed and then transmitted to the Merge Screen (MS) module 214 of FIG. 2. The transmission of the data to the MS module 214 of FIG. 2 preferably occurs through the use of a set of external First-In First-Out (FIFO) buffers 208 as shown in FIG. 2.

The transmission of the data from the LW module 202 of FIG. 2 to the MS module 214 of FIG. 2 via the set of FIFO buffers 208 of FIG. 2 occurs in a step 504.

Similarly, when the print data has been transmitted to the Continuous Tone (CT) module 206 of FIG. 2, it is decompressed and then transmitted to the MS module 214 of FIG. 2. The data streams are also transmitted via a FIFO buffer, however, in one embodiment of the CT module 206 of FIG. 2, the FLFO buffer is internal to the module and is not depicted. The transmission of the data from the CT module 206 of FIG. 2 to the MS module 214 of FIG. 2 via the FIFO buffer internal to the CT module 206 of FIG. 2, occurs in a step 508.

The Merge Screen (MS) module 214 of FIG. 2 receives the data concurrently from the LW module 202 of FIG. 2 and the CT module 206 of FIG. 2. When the MS module 214 of FIG. 2 has received the data, an error detection module 224 of FIG. 2a within the MS module 214 of FIG. 2 checks the error detection patterns for errors. In one embodiment, the error detection module 224 of FIG. 2a performs an exclusive or operation on the error detection patterns using the comparison circuit 226 is FIG. 2a to see whether the error detection patterns are received substantially simultaneously. The comparison of the error detection patterns is conducted in a step 510 of the error detection process 500.

If the error detection patterns in the Linework and Continuous Tone data streams indicate that the error detection patterns match and were received substantially simultaneously, or are otherwise correct, the merge screen module merges the data from the two streams of data (and screens the data if the data is color printer data) and transmits the scan line to the print engine 108 of FIG. 1. The transmission takes place in a step 512 of the error detection process 500. The process repeats again at steps 502 and 506 until all print data has been processed.

If, however, the error detection patterns in the Linework and Continuous Tone data streams do not match, or are otherwise incorrect, the merge screen module outputs an error message to the processor 104 of FIG. 1 at steps 514 and 516. The processor 104 may then transmit a message to the print engine 108 of FIG. 1 instructing the print engine 108 to terminate printing and wait for further data streams. The processor 104 of FIG. 1 is also preferably sent a message listing the type of error encountered. Preferably, a user is then notified of the error and the print job is repeated.

Figure 6:
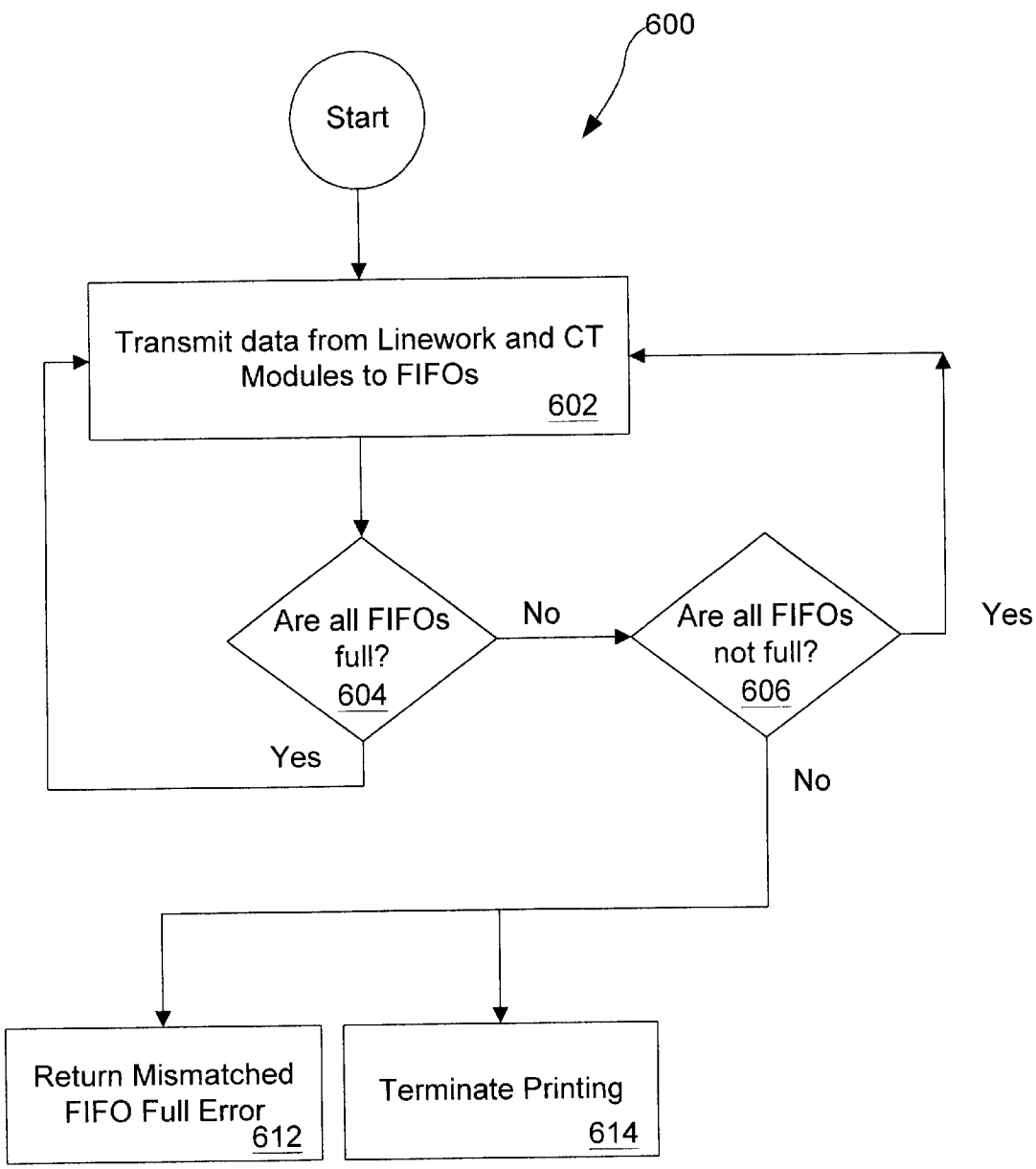
FIG. 6 is a flow diagram illustrating a second embodiment of an error check process employing an error check of the present invention.

FIG. 6 is a schematic flow chart diagram illustrating a process 600 that may be used to check for errors in the First-In First-Out buffers 208 of FIG. 2. In a step 602 of the error checking process 600, a data stream is transmitted from the Linework module 202 of FIG. 2 to the set of FIFO buffers 208 of FIG. 2. When the Linework module 202 of FIG. 2 is ready to transmit data to the FIFO buffers 208 of FIG. 2 it evaluates the FIFO full condition of each of the FIFO buffers 208 of FIG. 2 in a step 604.

If any FIFO buffer 208 is marked as full, all FIFO buffers must be marked as full so that data being transmitted to the Merge Screen module 214 of FIG. 2 is not out of sync. Therefore, in step 604, the Linework module 202 of FIG. 2 first determines whether all the FIFO buffers 208 are marked as full. If all the FIFO buffers 208 are marked as ftill, an error has not occurred and more data is transmitted at the step 602. If all FIFO buffers 208 are not full, the process progresses to a decision step 606 where it is determined whether all FIFO buffers 208 are not full. If the result here is yes, the process returns to the step 602.

If, on the other hand, the result at the step 606 is no, a mismatched FIFO full error has occurred. In a step 612, the mismatched FIFO full error is returned to the host system by the error notification module 230, and in a step 614 the printing process is terminated.

Figure 7:
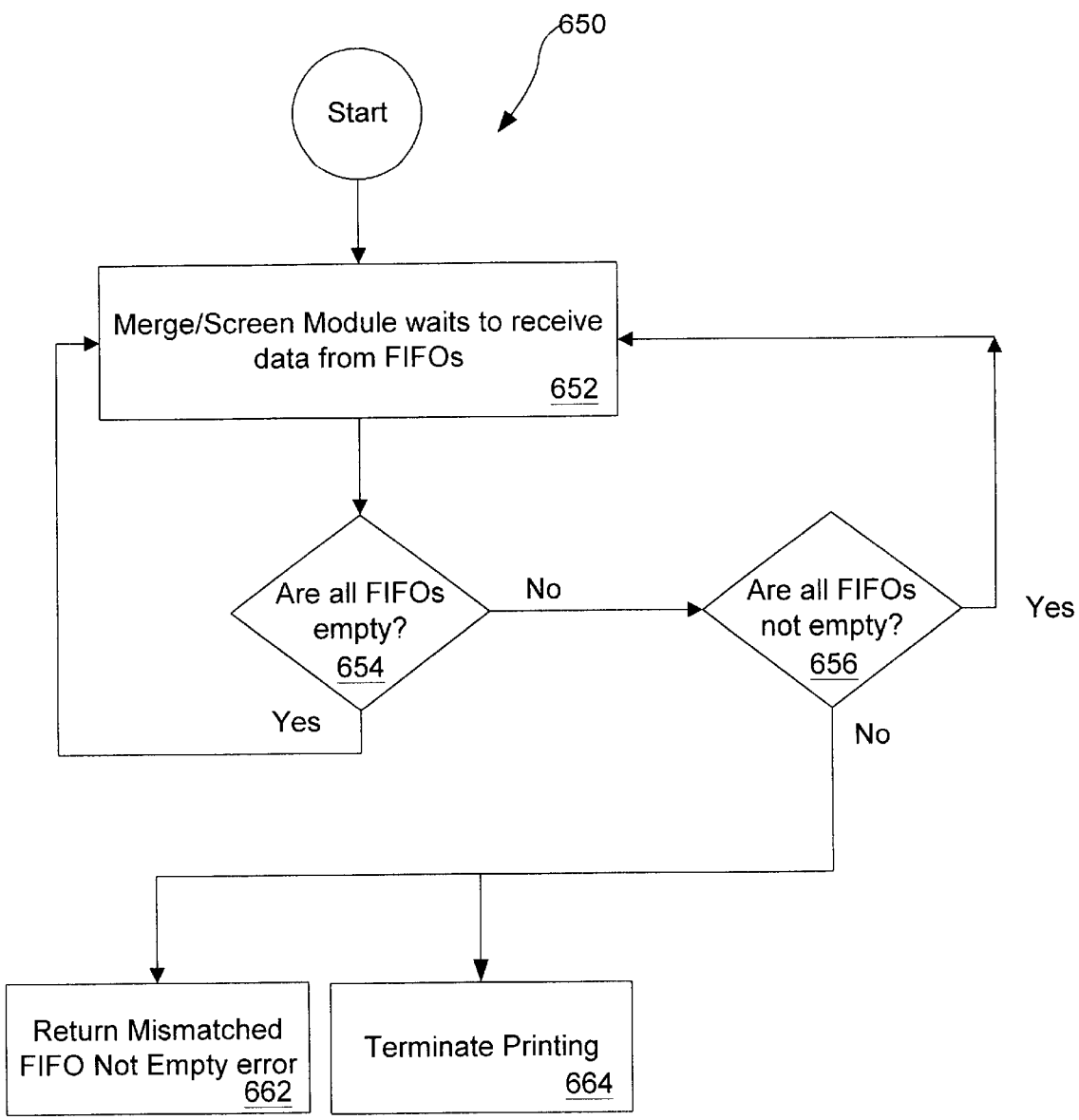
FIG. 7 is a flow diagram illustrating a third embodiment of an error check process employing an error check of the present invention.

FIG. 7 is a schematic flow chart diagram illustrating a process 650 that may be used to check for additional errors in the First-In First-Out buffers 208 of FIG. 2. In a step 652 of the error checking process 650, the Merge Screen module 214 of FIG. 2 awaits receipt of a data stream from the Linework module 202 of FIG. 2 via the set of FIFO buffers 208 of FIG. 2. When the Merge Screen module 214 of FIG. 2 is ready to receive data, it evaluates the FIFO empty condition in a step 654 to ascertain whether any FIFO buffers 208 are not empty.

If any FIFO buffer is marked as not empty, all FIFO buffers should be marked as not empty so that print data being received by the Merge Screen module 214 of FIG. 2 is not out of sync. Therefore, in step 654, the Merge Screen module 214 of FIG. 2 verifies that all of the FIFO buffers 208 are marked as empty. If all the FIFO buffers are marked as empty, an error condition has not occurred and the process 650 returns to step 652 to await more data.

If the result at the step 544 is no, the process 650 proceeds to a decision step 656 where the Merge Screen module 214 checks whether all FIFO buffers 208 are not empty. If the result is yes, an error has not occurred and the process 650 returns to the step 652. If the result at step 656 is no, a mismatched FIFO error has occurred. In step a 662, the mismatched FIFO error is returned to the host system and in a step 664 the printing process is terminated.

The methods 500, 600, 650 may be used individually or in any combination. The method 500 preferably checks for both end of line and end of sheet errors, but of course could alternatively check for only one or the other.

It should be noted that the application of the error checking system and methods described herein is not limited to printer systems. In other embodiments, the error checking scheme described herein may also be used with other digital data scanning systems such as a high definition television system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of error checking in a digital scanning device having a plurality of parallel data streams, comprising:
   generating an error detection pattern in each of a plurality of parallel data streams;
   transmitting each data stream through a separate data channel, each of the data channels having a termination point;
   evaluating an error detection pattern of each data stream to determine whether an error condition has occurred;
   processing the data if an error condition has not occurred; and
   generating an error message if an error condition has occurred.

2. The method of claim 1, wherein evaluating the error detection pattern further comprises concurrently comparing the error detection patterns from the plurality of data streams at the respective termination points of each data channel.

3. The method of claim 1, wherein the error detection patterns are evaluated to determine whether the parallel bits of the error detection patterns are received at substantially the same time.

4. The method of claim 3, wherein determining whether the parallel bits of the error detection patterns are received at substantially the same time comprises exclusively ORing the error detection patterns together.

5. The method of claim 1, wherein determining that an error condition has occurred comprises detecting misalignment of print data at print media edges during the printing of a scan row.

6. The method of claim 1, wherein determining that an error condition has occurred comprises detecting a mismatch condition of parallel FIFO buffers during the transmission of data through the FIFO buffers.

7. The method of claim 1, wherein the error detection pattern comprises an end of scan marker.

8. The method of claim 1, wherein the error detection pattern comprises an end of sheet marker.

9. The method of claim 1, further comprising evaluating a plurality of error detection patterns for each data stream, a first error detection pattern comprising an end of scan marker and a second error detection pattern comprising an end of sheet marker.

10. The method of claim 1, wherein the error detection pattern comprises a FIFO full flag.

11. The method of claim 1, wherein the error detection pattern comprises a FIFO not full flag.

12. The method of claim 1, wherein the error detection pattern comprises a FIFO empty flag.

13. The method of claim 1, wherein the error detection pattern comprises a FIFO not empty flag.

14. The method of claim 1, wherein the error message comprises a signal to stop transmission of the data streams.

15. The method of claim 1, wherein the error message comprises a notification that processing has ceased.

16. A method of error checking comprising:
   selecting a test bit pattern in each of a plurality of parallel data streams, the test bit pattern comprising one or more bits of a data stream;
   transmitting each data stream through a separate data channel, each of the data channels having a termination point;
   evaluating the test bit pattern of each data stream at the respective termination points of each data channel by comparing the test bit pattern of a first data stream with the test bit pattern of a second data stream to determine whether the test bit pattern of the first data stream is substantially the same as the test bit pattern of the second data stream and if the test bit patterns are not substantially the same, determining that an error condition has occurred;
   processing the data streams if an error message has not occurred; and
   generating an error message if an error message has occurred.

17. The method of claim 16, wherein the test bit pattern comprises an end of scan marker.

18. The method of claim 16, wherein the test bit pattern comprises an end of sheet marker.

19. The method of claim 16, further comprising evaluating a plurality of test bit patterns for each data stream, a first test bit pattern comprising an end of scan marker and a second test bit pattern comprising an end of sheet marker.

20. The method of claim 16, wherein the test bit pattern comprises a FIFO full flag.

21. The method of claim 16, wherein the test bit pattern comprises a FIFO empty flag.

22. An error detection system of a digital scanning device having a plurality of parallel data streams, comprising:
- a processor configured to transmit a plurality of parallel data streams through separate data channels, each of the data channels having a termination point;
- an error detection pattern generation module configured to generate an error detection pattern in each of a plurality of parallel data streams;
- an error detection module coupled to the processor and configured to receive and evaluate the plurality of parallel data streams from the processor, the error detection module further configured to evaluate the error detection patterns at the respective termination points of each data stream to determine whether an error condition has occurred.

23. The error detection system of claim 22, wherein the error detection module is configured to compare the timing with which the error detection patterns are received.

24. The error detection system of claim 22, wherein the error detection module comprises an exclusive OR circuit configured to compare the error detection patterns in each of a plurality of data streams.

25. The error detection system of claim 22, further comprising an error notification module configured to notify the print engine to terminate printing if an error condition is present.

26. The error detection system of claim 22, wherein the error notification module is further configured to notify the processor to terminate transmission of the data streams.

* * * * *

UNITED STATES PATENT AND TRADEMARK OFFICE
CERTIFICATE OF CORRECTION

PATENT NO. : 6,671,835 B1 Page 1 of 1
DATED : December 30, 2003
INVENTOR(S) : Hanna et al.

It is certified that error appears in the above-identified patent and that said Letters Patent is hereby corrected as shown below:

Column 3,
Line 41, "is an digital" should read -- is a digital --.

Column 5,
Line 50, "and error" should read -- an error --.
Line 52, "FIG. 1." should read -- FIG. 2. --.

Column 6,
Line 9, "FLFO" should read -- FIFO --.
Line 22, "226 is" should read -- 226 in --.
Line 60, "as ftill," should read -- as full, --.

Column 7,
Line 22, "step 544" should read -- step 654 --.
Line 27, "step a 662" should read -- step 662 --.

Signed and Sealed this

Fourth Day of May, 2004

JON W. DUDAS
*Acting Director of the United States Patent and Trademark Office*